Figure 1:
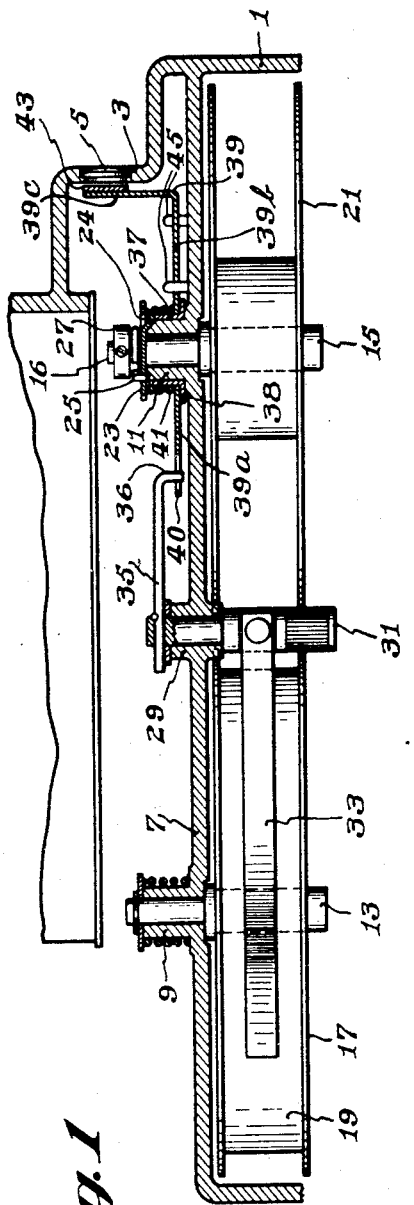

Aug. 15, 1939.　　G. A. DEL VALLE　　2,169,229

MOTION PICTURE CAMERA

Filed Jan. 31, 1936

INVENTOR
GUILLERMO A. DEL VALLE
BY
ATTORNEY

Patented Aug. 15, 1939

2,169,229

UNITED STATES PATENT OFFICE 2,169,229

MOTION PICTURE CAMERA

Guillermo A. del Valle, Oaklyn, N. J., assignor to Radio Corporation of America, a corporation of Delaware Application January 31, 1936, Serial No. 61,773

8 Claims. (Cl. 33—172)

This invention relates to motion picture cameras, and more particularly to means in such cameras for directly indicating, at any instant, the footage of film still available in the camera for exposure.

Various means have heretofore been proposed for indicating the footage of unexposed film in a camera. According to one of these, a movable arm, held against the outer turn of the film on a supply reel by a spring, gradually approaches the hub of the reel as the film is unwound therefrom and is arranged to actuate suitable indicating mechanism which may be viewed by the operator. To this type of indicating device, as heretofore constructed, there are several serious objections. In the first place, considerable annoyance is oftentimes experienced in mounting the supply reel on its spindle for the reason that the aforesaid arm, being constantly constrained toward the spindle, prevents ready mounting of the reel and therefore must be held out of its way as the reel is being mounted. Thus, one hand must usually be used to hold the arm away from the spindle while the reel is mounted with the other hand, and since the reel is ordinarily mounted in the dark, there is occasion for considerable inconvenience. Another objection to some prior art indicators of this type is that the spring which holds the aforementioned arm against the film on the supply reel must be made quite strong, and the force with which it causes the arm to bear against the supply reel not only causes it to scratch the film badly, but also imposes an unnecessary load upon the driving mechanism, particularly upon starting. Certain of the prior art indicating devices are also objectionable from the standpoint of multiplicity of parts and relatively complicated structure.

The primary object of my invention is to provide an improved footage indicator for motion picture cameras which will be free from the foregoing and other objections characteristic of prior art indicating devices.

More specifically, it is an object of my invention to provide, in motion picture cameras, an improved footage indicator which will accurately and directly indicate the footage of unexposed film still available for exposure at any instant.

Another object of my invention is to provide an improved footage indicator as aforesaid which will not interfere in the least with mounting of the supply reel in the camera.

Still another object of my invention is to provide an improved footage indicator for motion picture cameras which will not impose any undue or unnecessary load upon the driving mechanism of the camera.

A further object of my invention is to provide, in moving picture cameras, an improved footage indicator of the type set forth which is simple in construction, yet will not easily get out of order, which is highly efficient in use, which is inexpensive of manufacture, and which will not cause injury to the film.

In accordance with my invention, I hold a pivotally mounted arm gently in engagement with the periphery, or outer turn, of the film on the supply reel by means of a frictionally driven element to which is secured a suitable scale. This scale is preferably graduated to read directly the number of feet of film left on the supply reel at any instant for exposure and is arranged to be easily readable from outside of the camera through a suitable sight or lens. Since the frictionally driven element can slip with respect to its driving element, it is clear that the film engaging arm can be displaced easily from the vicinity of the supply reel spindle to permit facile mounting of the supply reel thereon. Also, the slip coupling between the driving and driven elements removes the possibility of imposing undue pressure upon the unexposed film left on the supply reel, while at the same time always insuring positive engagement of the arm with the film.

The novel features that I consider characteristic of my invention are set forth with particularity in the appended claims. However, the invention itself, as well as the method of operation thereof, together with additional objects and advantages thereof, will best be understood from the following description of a specific embodiment thereof, when taken in connection with the accompanying drawing in which—

Figure 2:
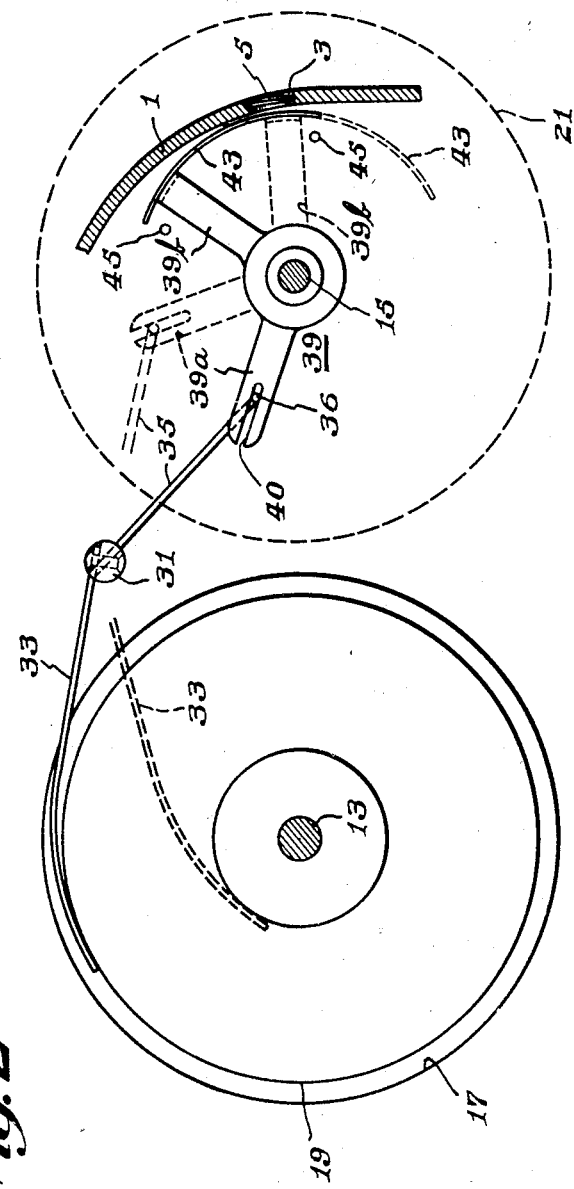

Figure 1 is a top plan view of my improved indicating device as applied to a camera and showing certain parts of the camera in section, and Figure 2 is a side elevation thereof in its relation to the supply and take-up reels, the supply reel being shown in full lines and the take-up reel in dotted lines.

Referring more specifically to the drawing wherein similar reference characters designate corresponding parts throughout, there is shown a camera casing 1 provided with a sight opening 3 in which may be mounted an enlarging lens 5, the casing 1 also having a partition 7 therein. Rotatably supported in bearings 9 and 11 in the partition 7 are a pair of spaced reel spindles 13 and 15, the former carrying a supply reel 17 on which an unexposed film 19 is wound and the latter carrying a take-up reel 21 for the film. Power is delivered to the spindle 15 and the reel 21 from a suitable motor (not shown) through a gear train which includes a gear 23 to which one end of a coil spring 25 is fixed, the spring 25 being fitted rather loosely around the reduced end 16 of the spindle 15 between the gear 23 and a sleeve 27 which is locked to the spindle end 16. As the gear 23 rotates in a clockwise direction as viewed in Fig. 2, it tightens the spring 25 around the spindle end 16 and thus effects clockwise rotation of the reel 21 whereby the film 19 is wound on the reel 21 as it is unwound from the reel 17.

Also rotatably carried by the partition 7 and extending through a bearing 29 therein is a shaft 31 which, on the reel side of the partition 7, has a forwardly extending arm 33 fixed thereto, and on the other side thereof has a rearwardly extending arm or rod 35 fixed thereto. The arms 33 and 35, in cooperation with the shaft 31, constitute a lever mechanism, the free end 36 of the arm 35 being offset somewhat at right angles to the main portion thereof for a purpose shortly to be described.

Rotatably mounted on the bearing 11 is a bushing 37 which is provided at one end with a flange 38 and at its other end with a peripheral notch into which extends a depressed lug 24 on the gear 23, the lug 24 affording driving engagement between the gear 23 and the bushing 37. Hence, as the gear 23 rotates, the bushing 37 rotates with it. A bellcrank 39 is rotatably carried on the hub 37 and is pressed into frictional, slipping engagement with the flange 38 by a coil spring 41 interposed between the gear 23 and the bellcrank 39 about the bushing 37. The arm 39a of the bellcrank 39 has a slot 40 therein adjacent its end to receive the offset end 36 of the arm 35, while the arm 39b thereof is offset at 39c and has secured thereto a dial scale or other suitable indicating element 43 which may be viewed through the lens 5.

When the reel 17 is to be mounted in the camera, the arm 33 is raised somewhat above its solid line position in Fig. 2, whereupon the arm 35 will move the bellcrank 39 somewhat counter-clockwise of its solid line position. This is easily accomplished by reason of the slip coupling between the bell crank 39 and the flange 38, and the pressure of the spring 41 is sufficient to hold the arm 33 in raised position, whereby mounting of the reel 17 on the spindle 13 is made easy. After the reel 17 has been properly mounted, the arm 33 is lowered into engagement with the periphery, or outer turn, of the film 19, as shown by solid lines in Fig. 2. A pair of stops 45 may be provided for the arm 39b to prevent movement of the bellcrank 39 in either direction to a point where the end 36 of the arm 35 will become disengaged from the slot 40.

When the camera motor is started and the gear 23 and bushing 37 rotate clockwise, the flange 38 frictionally actuates the bellcrank 39 in a clockwise direction whereby the arms 35 and 33 are actuated in a counter-clockwise direction about the shaft 31. Thus, the arm 33 is constantly held in positive, gentle engagement with the changing outer turn of the film 19, and the flange 38 advances the bellcrank 39 and its dial scale 43 in a clockwise direction only to the extent permitted by the arm 33 and as determined by the diameter of the film remaining on the reel 17. If, now, the scale 43 is graduated to indicate film footage as determined by diameter of the film remaining on the reel 17 at any instant, it is obvious that a direct reading may be quickly made through the lens 5 of the number of feet remaining on the reel 17 at any instant for exposure.

Although I have described but one specific embodiment of my invention, I am fully aware that many modifications thereof and changes therein may be made without departing from the spirit thereof. For example, the arm 35 may extend in the same direction as the arm 33, the bellcrank 39 mounted at the front of the camera, and the dial scale 43 arranged to be read from the front or the side of the casing 1 instead of from the rear. Also, in place of the lug 24, the end of the spring 25 fixed to the gear 23 may be extended therethrough into the peripheral slot of the bushing 37. Furthermore, the stops 45 may be provided in conjunction with the arm 39a or the arm 35 instead of the arm 39b. Many other changes will undoubtedly readily suggest themselves to those skilled in the art. I therefore desire that my invention shall not be limited except insofar as is made necessary by the prior art and by the spirit of the appended claims.

I claim as my invention:

1. In a motion picture camera, a device for indicating the footage of unexposed film which comprises a pivotally mounted member adapted to engage the outer turn of film on the supply reel, a second member pivotally mounted in spaced relation to said first named member, means coupling said members whereby movement of one imparts movement to the other, driving means, a slip coupling between said driving means and said second member, said driving means being adapted to drive said second member in a direction such that it will urge said first named member toward and hold it in engagement with said film, and an indicating element carried by said second member and movable therewith to a position determined by the instantaneous position of said first named member.

2. The invention set forth in claim 1 characterized in that the coupling means between said film engaging member and said second member is mounted for pivotal movement with said film engaging member.

3. The invention set forth in claim 1 characterized in that the coupling means between said film engaging member and said second member is mounted for pivotal movement with and on the same axis as said film engaging member and forms a lever therewith, and characterized further in that said second member constitutes a bellcrank one arm of which is cooperatively associated with the free end of said coupling means and the second arm of which carries said indicating element.

4. The invention set forth in claim 1 characterized in that the coupling means between said film engaging member and said second member is mounted for pivotal movement with and on the same axis as said film engaging member and forms a lever therewith, said coupling means having its free end offset, and characterized further in that said second member constitutes a bellcrank, one arm of said bellcrank being slotted to receive said offset end and the other end of said bellcrank carrying said indicating element.

5. In a motion picture camera, the combination of a casing having a sight opening therein, a supporting partition in said casing, a pair of rotatable reel spindles carried by said partition, a supply reel carrying a film on one of said spindles, a take-up reel for said film on the other of said spindles, lever mechanism pivotally mounted on said partition, a bellcrank pivotally mounted on said partition concentrically with said take-up reel spindle, means for driving said latter spindle, a frictional slip coupling between said driving means and said bellcrank for actuating said bellcrank, and an indicating element carried by one arm of said bellcrank in alignment with said sight opening, said lever mechanism having one arm in engagement with the outer turn of said film on said supply reel and having its other arm coupled to the second arm of said bellcrank, said driving means being adapted to actuate said bellcrank in a direction to urge said first named lever arm toward and hold it in engagement with the film on said supply reel whereby said indicating element will indicate through said sight opening the instantaneous position of said first named lever arm and thereby give an indication of the amount of film left in said supply reel.

6. The invention set forth in claim 5 characterized in that said lever mechanism is pivotally carried by a shaft extending through said partition and characterized further in that both said film reels and said first named lever arm are located on one side of said partition, said other arm of the lever mechanism and said bellcrank being located on the other side of said partition.

7. The invention set forth in claim 6 characterized in that said second arm of the bellcrank has an elongated slot therein adjacent its free end, and characterized further in that said other arm of the lever mechanism has an offset end received in said slot.

8. The invention set forth in claim 5 characterized in that said second arm of the bellcrank has an elongated slot therein adjacent its free end, characterized further in that said other arm of the lever mechanism has an offset end received in said slot, and characterized still further by the addition of stop means on said partition for limiting the pivotal movement of said bellcrank and said lever mechanism whereby to prevent disengagement of said offset end and said slot.

GUILLERMO A. DEL VALLE.